United States Patent
Ghanma

[19]

[11] Patent Number: 6,134,103
[45] Date of Patent: Oct. 17, 2000

[54] FLAT PANEL DISPLAY WITH ADJUSTABLE HEIGHT FOR A PORTABLE COMPUTER

[76] Inventor: Tony Ghanma, 410 Milan Dr. #115, San Jose, Calif. 95051

[21] Appl. No.: 09/183,780

[22] Filed: Oct. 30, 1998

[51] Int. Cl.[7] ........................................................ G06F 1/16
[52] U.S. Cl. .......................... 361/681; 361/727; 248/917; 248/918; 248/920; 248/923
[58] Field of Search ................... 361/681, 682; 248/920, 917, 918, 921, 922, 923

[56] References Cited

U.S. PATENT DOCUMENTS

| | | | |
|---|---|---|---|
| 4,395,010 | 7/1983 | Helgeland et al. | 248/920 |
| 4,669,694 | 6/1987 | Malick | 248/923 |
| 5,128,662 | 7/1992 | Failla | 361/681 |
| 5,148,282 | 9/1992 | Sedighzadeh | 348/825 |
| 5,209,448 | 5/1993 | Hatanaka et al. | 361/681 |
| 5,229,920 | 7/1993 | Spaniol et al. | 361/681 |
| 5,267,123 | 11/1993 | Boothroyd et al. | 361/681 |
| 5,337,212 | 8/1994 | Bartlett et al. | 361/681 |
| 5,644,469 | 7/1997 | Shioya et al. | 361/681 |
| 5,668,570 | 9/1997 | Ditzik | 361/681 |
| 5,769,369 | 6/1998 | Meinel | 248/917 |
| 5,812,368 | 9/1998 | Chen et al. | 361/681 |

Primary Examiner—Leo P. Picard
Assistant Examiner—John D. Reed
Attorney, Agent, or Firm—Kevin H. Fortin, Esq.

[57] ABSTRACT

An apparatus for an adjustable display for a portable computer results in ergonomic viewing angles for the display. The adjustable display for the portable computer comprises a main computer enclosure, a support slab coupled to the main computer enclosure, and a flat panel display slidably coupled to the support slab configured to slide along the support slab to raise and lower the flat panel display with respect to the main computer enclosure.

6 Claims, 5 Drawing Sheets

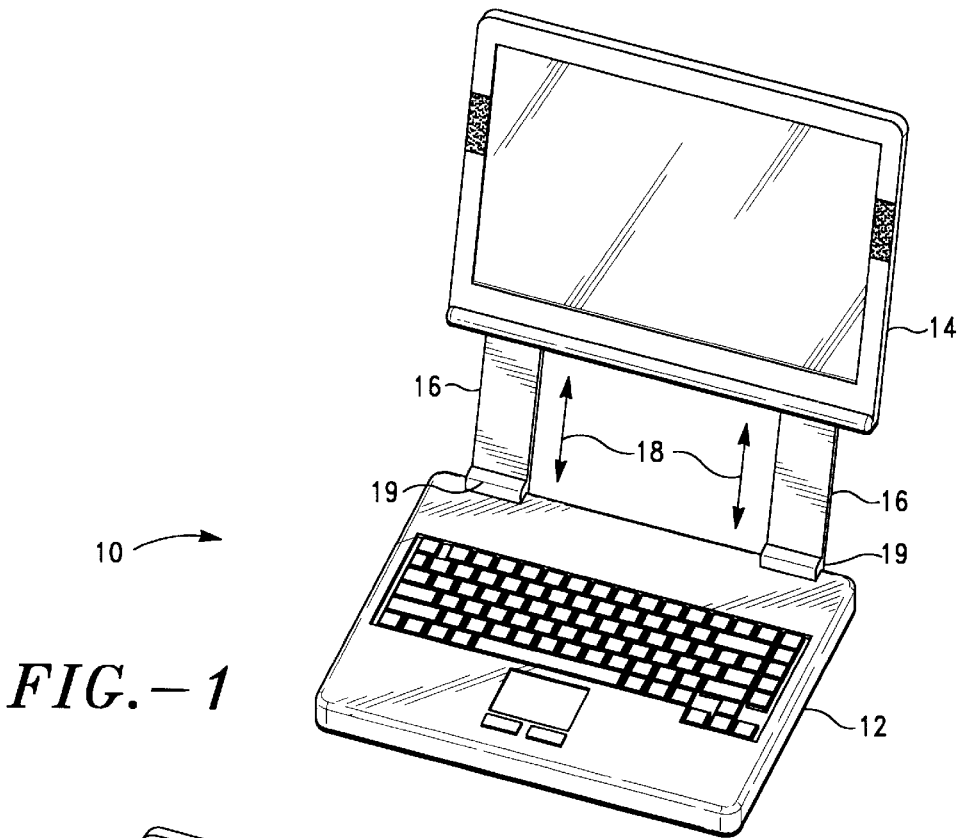
FIG.—1
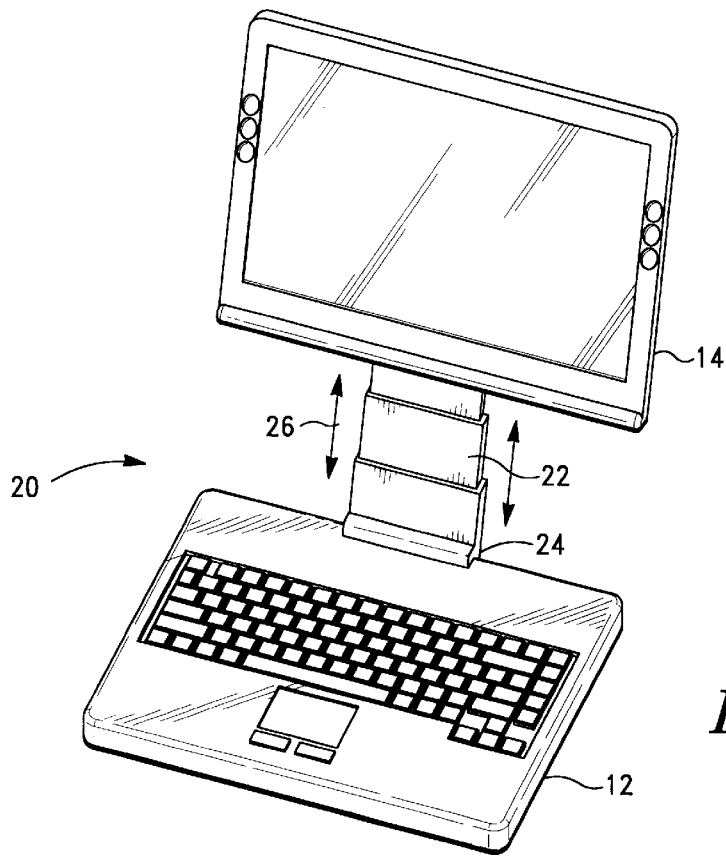
FIG.—2

FLAT PANEL DISPLAY WITH ADJUSTABLE HEIGHT FOR A PORTABLE COMPUTER

BACKGROUND OF THE INVENTION

1. Field of the Invention

The present invention relates to adjustable displays for portable computers and more particularly to manipulating flat panel displays to provide optimal ergonomic viewing angles.

2. Description of the Related Arts

As the use of computers is increased, there has been a greater need to display data and information on display units such as cathode ray tubes or flat panel displays. With increases in both the number of people using video display terminals and the amount of time that an individual user spends in front of the terminal, it has become evident that the occurrence of headaches, user fatigue, and eye, neck and back strain has increased. The ergonomics associated with the video display units become a major consideration in the design thereof.

Ideally, for a worker to be most productive, he should use a video display terminal that can be tilted to reduce overhead glare and be raised or lowered to accommodate his stature. Such adjustment should be simple and intuitive. It should not be difficult for even the first time user to discover and perform the adjustments to the display terminal.

Therefore, it is desirable to provide a display terminal that is easily manipulated by the user to provide optimal ergonomic viewing angles to lessen the occurrence of headaches, user fatigue, and eye, neck, back strain and other ailments associated with spending large amounts of time viewing the display terminal.

SUMMARY OF THE INVENTION

The present invention provides embodiments of display terminals that are easily manipulated by the user to provide optimal ergonomic viewing angles. One embodiment of the display terminal is based on an adjustable flat panel display for a portable computer. Thus, according to one aspect of the invention, a portable computer comprises a main computer enclosure, a support slab coupled to the main computer enclosure, and a flat panel display slidably coupled to the support slab configured to slide along the support slab to raise and lower the flat panel display with respect to the main computer enclosure.

According to another aspect of the invention, a hinge coupled between the main computer enclosure and the support slab is configured to provide angular positioning of the flat panel display. Thus, a user easily manipulates the flat panel display up, down, and in an angular fashion to obtain optimal ergonomic viewing angles.

According to yet another aspect of the invention, the support slab includes two support slabs. The multiple support slabs give added stability to the flat panel display.

According to another aspect of the invention, the support slab includes a telescoping support. The telescoping support reduces the amount of space needed to accommodate the support slab within the flat panel display. This enables additional circuitry to be accommodated within a flat panel display assembly.

Accordingly to another aspect of the invention, the support slab includes a plurality of retractable slats. A slat container stores the retractable slats as the slats retract into the slat container. This embodiment enables even more circuitry to be accommodated within the flat panel display assembly.

An adjustable flat panel display for a portable computer is provided whereby the multitude of adjustments provides optimal ergonomic viewing angles to lessen the occurrence of headaches, user fatigue, and eye, neck, back strain and other ailments associated with spending large amounts of time viewing the display terminal. Other aspects and advantages of the present invention can be seen upon review of the figures, the detailed description, and the claims which follow.

BRIEF DESCRIPTION OF THE DRAWING

FIG. 1 illustrates an embodiment of an adjustable flat panel display having slidable slab supports a portable computer according to the present invention.

FIG. 2 illustrates an embodiment of an adjustable flat panel display having telescoping support a portable computer according to the present invention.

DETAILED DESCRIPTION OF TH INVENTION

Figure 3:
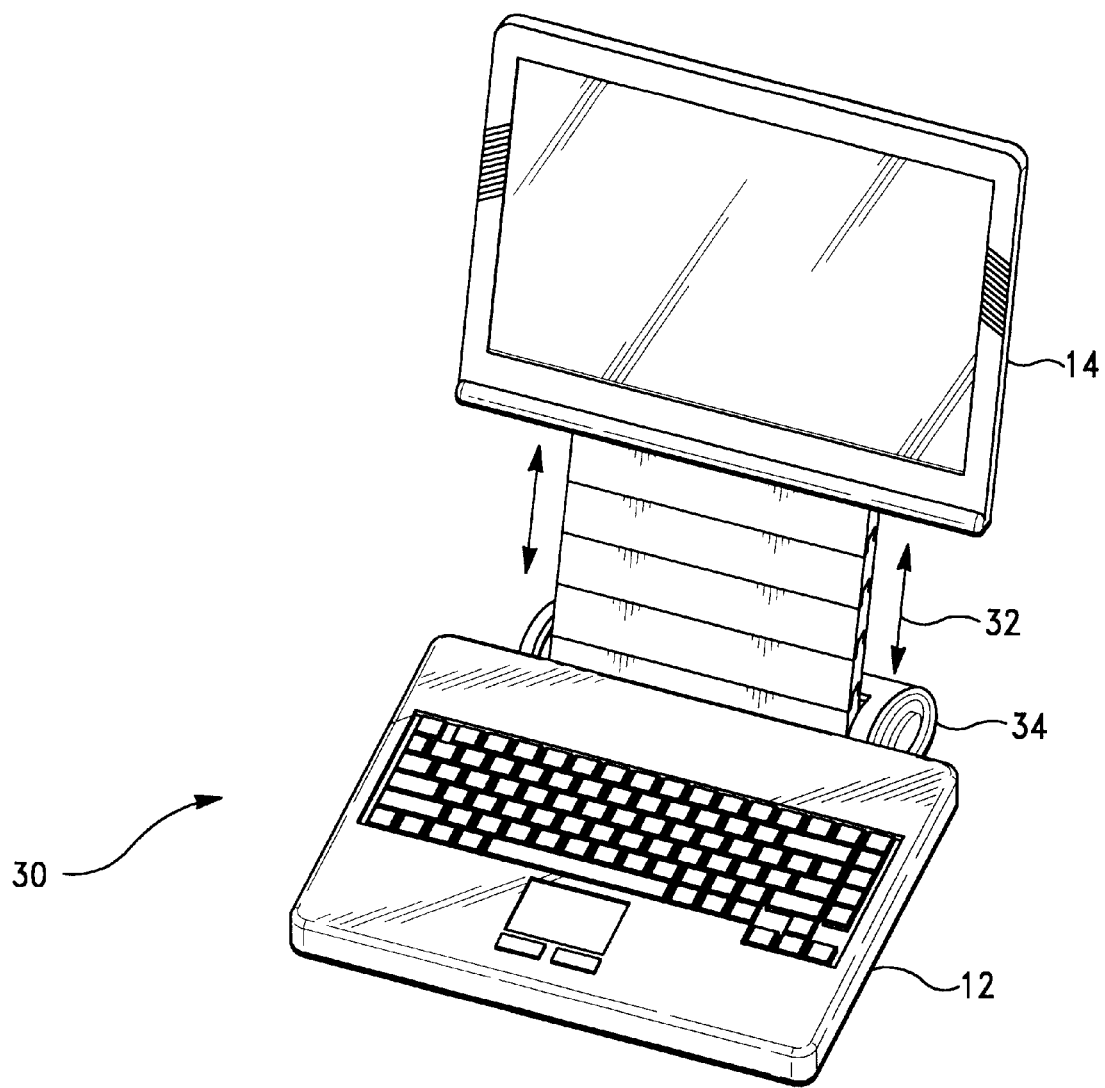
FIG. 3 illustrates an embodiment of an adjustable flat panel display having retractable slats support for a portable computer according to the present invention.

The invention will be described with respect to the Figures in which FIG. 1 generally shows an embodiment of an adjustable flat panel display having extendable support for a portable computer 10 according to the present invention. The portable computer 10 includes a main computer enclosure 12, flat panel display 14, support slabs 16, and hinges 19. The main computer enclosure 12 a user interface having a keyboard and touch pad to control a cursor for interfacing with the computer 10. The main computer enclosure 12 houses components that enable the portable computer to functionally operate as a personal computer. The components include a CPU, memory, hard drive, modem, networking electronics, interconnects and other components that are well known in the art. The flat panel display 14 provides a display for input and output data. The flat panel display 14 slidable mounts to the computer enclosure 12 via the slabs 16. The flat panel display 14 slides along the slabs 16 to enable the flat panel display 14 to be raised or lowered in accordance with the direction defined by the double headed arrows 18. The hinge mechanism 19 rotates the flat panel display 14 to provide angular adjustment while the slabs 16 affords linear adjustment. The hinge mechanism 19 also affords the flat panel display to close over the main computer enclosure 12 for storage.

FIG. 2 illustrates an embodiment of an adjustable flat panel display having a telescoping support for a portable computer 20. The portable computer 20 includes a main computer enclosure 12, a flat panel display 14, a telescoping support 22, and a hinge mechanism 24. The main computer enclosure 12 includes a user interface having a keyboard and touch pad for interfacing with the computer 10. The main computer enclosure 12 houses components that enable the portable computer to functionally operate as a personal computer well known in the art The flat panel display 14 provides a display for input and output data. The flat panel display 14 mounts to the telescoping mount 22. The telescoping mount 22 affords the flat panel display 14 to be raised or lowered in accordance with the direction defined by the double headed arrows 26. The hinge mechanism 24 rotates the flat panel display 14 to provide angular adjustment while the telescoping support 22 affords linear adjustment. As the flat panel display 14 is completely lowered retracting the telescoping support 22, the flat panel display 14 includes a recessed area to accept the telescoping support 22 so that the flat panel display 14 doses over the computer enclosure 12 for storage.

FIG. 3 illustrates an embodiment of an adjustable flat panel display having retractable slats support for a portable computer 30 according to the present invention. The portable computer 30 includes a main computer enclosure 12, a flat panel display 14, slats 32, and a slat container 34. The main computer enclosure 12 includes a user interface having a keyboard and touch pad for interfacing with the computer 10. The main computer enclosure 12 houses components that enable the portable computer to functionally operate as a personal computer well known in the art. The flat panel display 14 provides a display for input and output data. The flat panel display 14 mounts to the slats 32. The slats 32 afford support as the flat panel display 14 is raised, lowered and tilted. The slats 32 lock to rigidly support the flat panel display 14. As the flat panel display 14 is lowered, the slats 32 unlock and retract into the slat container 34 for storage.

Figure 4A:
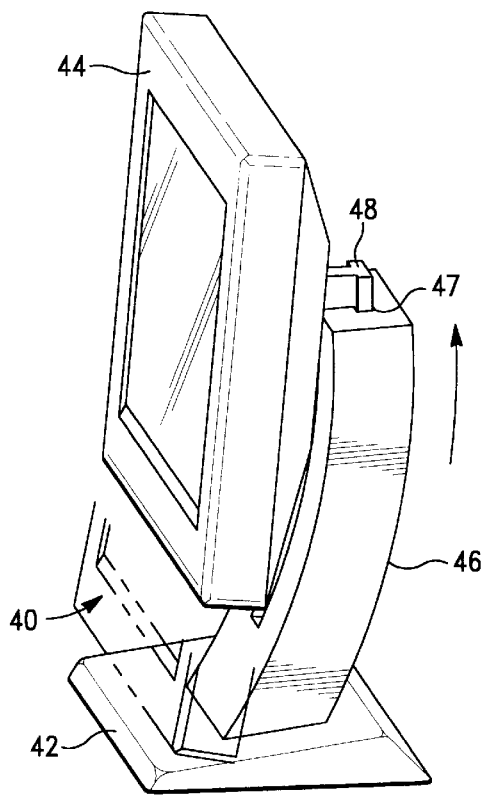
FIG. 4A illustrates an embodiment of an adjustable flat panel display having arced channel support base in a raised position according to the present invention.

FIG. 4A illustrates an embodiment of an adjustable flat panel display assembly 40 having an arced channel support in a raised position according to the present invention. The flat panel display assembly 40 includes a base 42, a flat panel display 44, and an arced channel support 46. The arced channel support 46 includes a T channel 47. The flat panel display 44 includes a T-shaped protrusion 48 that slidably mates with the T channel 47 of the arced channel support 46. Friction between the T-shaped protrusion 48 and the T channel 47 affords the flat panel display 44 to be positioned in any number of positions along the T channel 47.

Figure 4B:
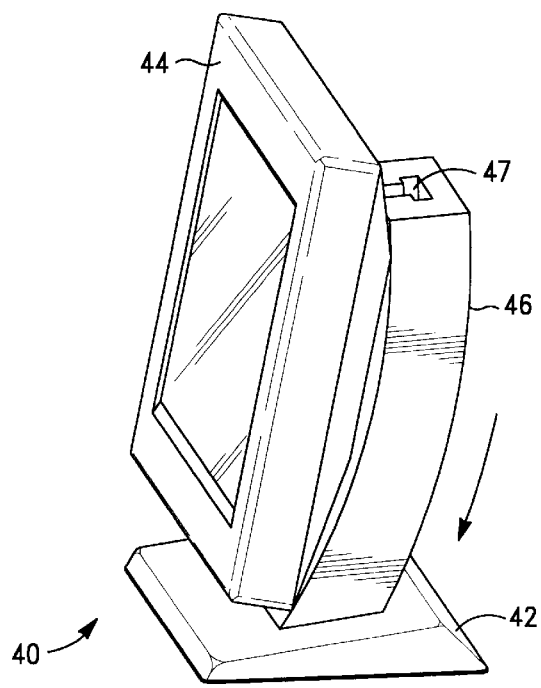
FIG. 4B .illustrates an embodiment of an adjustable flat panel display having arced channel support base in a lowered position according to the present invention.

FIG. 4B illustrates the flat panel display assembly 40 in a lowered position. As FIG. 4B illustrates, the flat panel display 44 is lowered close to the base 42. The T-shaped protrusion 48 of the flat panel display 44 is contained within the T channel 47 of the arced channel support 46. A user of the flat panel display 44 easily manipulates the viewing height and angle of the flat panel display 44 as the T-shaped protrusion 48 slides within the T channel 47 of the arced channel support 46.

Figure 5A:
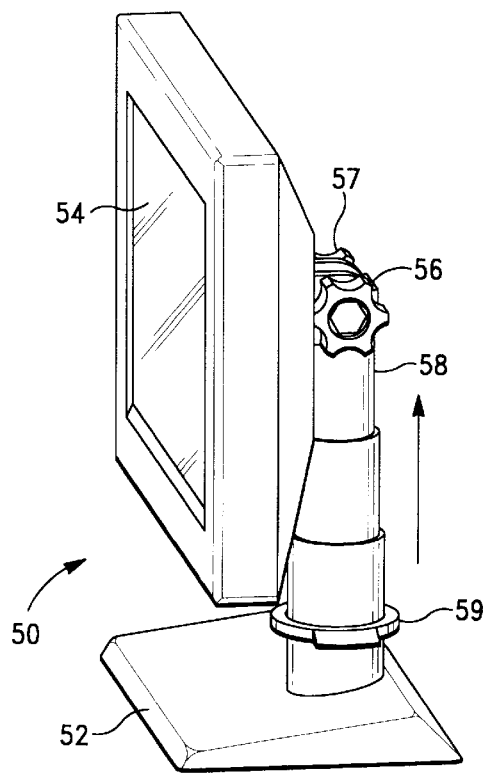
FIG. 5A illustrates an embodiment of an adjustable flat panel display having telescoping support base in a raised position according to the present invention.

FIG. 5A illustrates an embodiment of an adjustable flat panel display assembly 50 having a telescoping support base in a raised position according to the present invention. The flat panel display assembly 50 includes a base 52, a flat panel display 54, a hand wheel 56, a telescoping mechanism 58, and an actuating tab 59. The actuating tab 59 releases the telescoping mechanism 58 to raise and lower the flat panel display 54. The hand wheel 56 releases tension at pivot 57 to rotate the flat panel display 54 about the pivot 57.

Figure 5B:
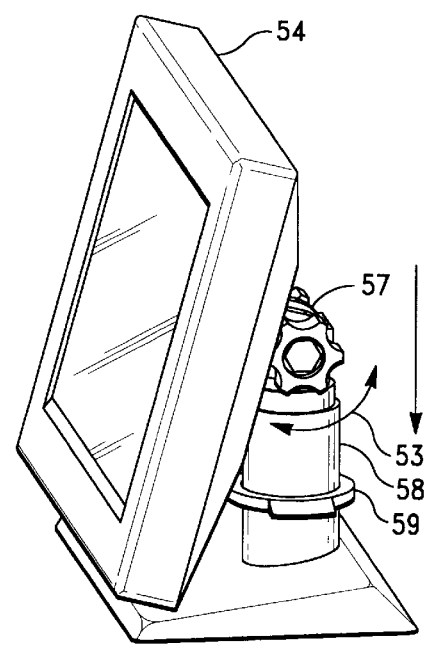
FIG. 5B illustrates an embodiment of an adjustable flat panel display having telescoping support base in a lowered position according to the present invention.

FIG. 5B illustrates the adjustable flat panel display assembly 50 having the telescoping support base in a lowered position. The double arrow head 53 illustrates the angular motion of the flat panel display 54 about the pivot 57 when tension at the pivot 57 is released by turning hand wheel 56. The telescoping mechanism 58 is retracted to place the flat panel display 54 in the lowered position. According to the present invention, the telescoping mechanism 53 is a pneumatic piston that operates in conjunction with the activating tab 59. The pneumatic piston is engineered such that little effort raises and lowers the flat panel display 54 when the activating tab 59 is triggered. Thus, the flat panel display 54 may be positioned in any number of varying positions within the operating range of the telescoping mechanism 58.

Figure 6:
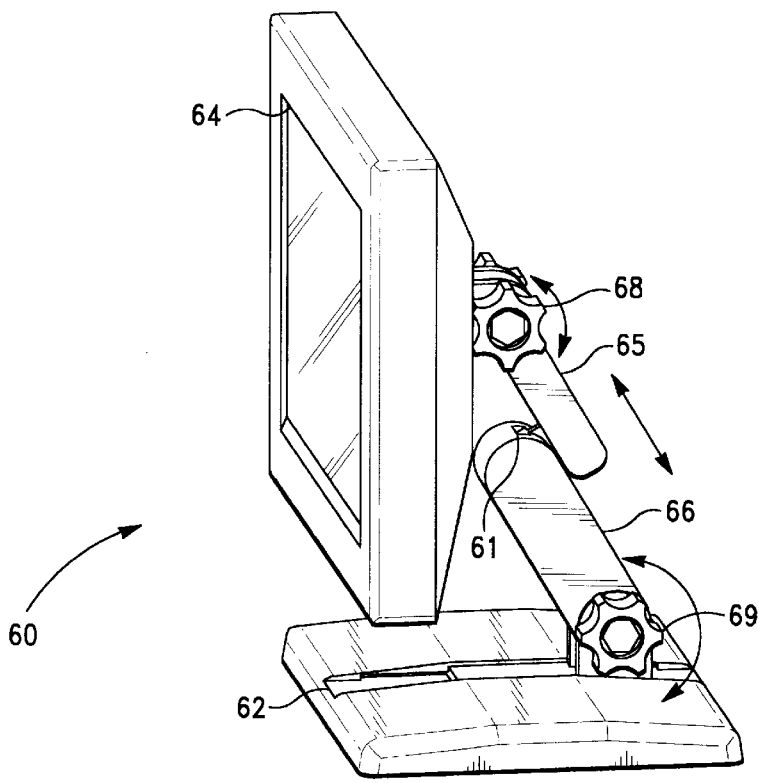
FIG. 6 illustrates an embodiment of an adjustable flat panel display having slidable elongated support according to the present invention.

FIG. 6 illustrates an embodiment of an adjustable flat panel display assembly 60 having slidable elongated support members according to the present invention. The adjustable flat panel display assembly 60 includes a base 62, flat panel display 64, main member 66, main hand wheel 69, minor member 65, and minor hand wheel 68. The main member 66 includes a channel 61, and the minor member 65 includes a protrusion (not shown) that mates with the channel 61 of the main member 66. Accordingly, main member 66 is attached to minor member 65 such that the length of the main member 66 and minor member 65 can be varied. An interference fit between the channel 61 of the main member 66 and the protrusion of the minor member 65 provides friction to support the flat panel display 64 in varies extended and retracted positions. Main hand wheel 69 and minor hand wheel 68 afford angular positioning of the flat panel display 64. Thus, the flat panel display 64 can be manipulated into any number of positions by extending the minor member 65 with respect to the main member 66 and angular positioning from adjustment of the main hand wheel 69 and minor hand wheel 68.

Figure 7:
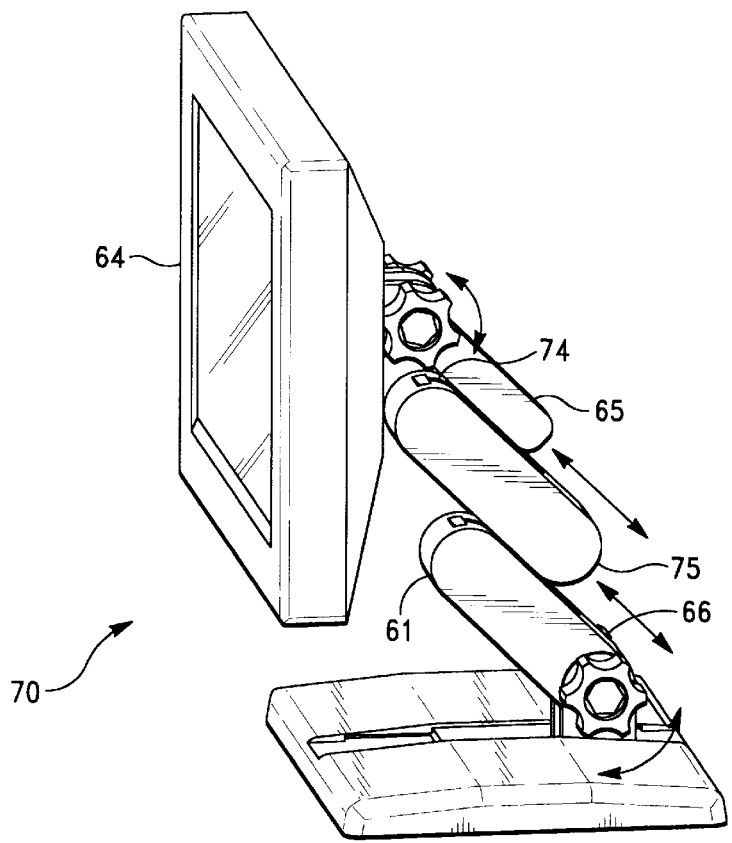
FIG. 7 illustrates an embodiment of an adjustable flat panel display having multiple slidable elongated supports according to the present invention.

FIG. 7 illustrates an embodiment of an adjustable flat panel display assembly 70 having multiple slidable elongated support members. The flat panel display assembly 70 is similar to the adjustable flat panel display assembly 60 of FIG. 6 with the addition of an intermediate member 75. The intermediate member 75 includes a channel 74 and a protrusion (not shown) similar to the protrusion of minor member 65 of the adjustable flat panel display assembly 60. The protrusion of minor member 65 mates with the channel 74 of intermediate member 75, and the protrusion of intermediate member 75 mates with the channel 61 of the main member 66. Accordingly, the intermediate member 75 affords increased extension of the flat panel display 64 compared to the adjustable flat panel display assembly 60 having the extension of the main member 66 and the minor member 65.

Figure 8:
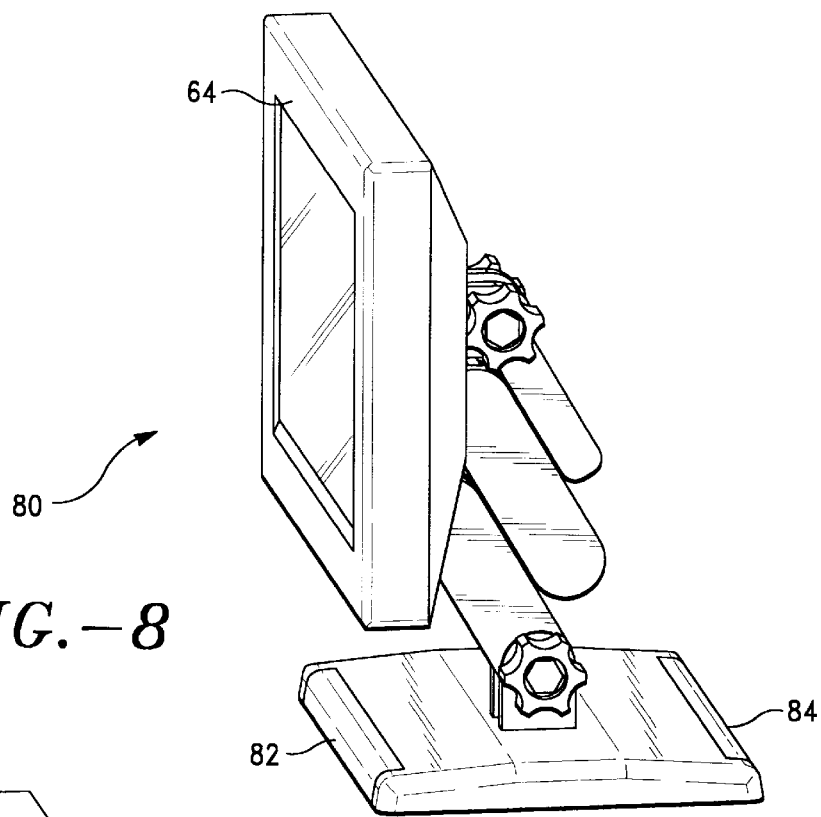
FIG. 8 illustrates an embodiment of an adjustable flat panel display having multiple slidable elongated supports including extendable base supports in retracted position according to the present invention.
Figure 9:
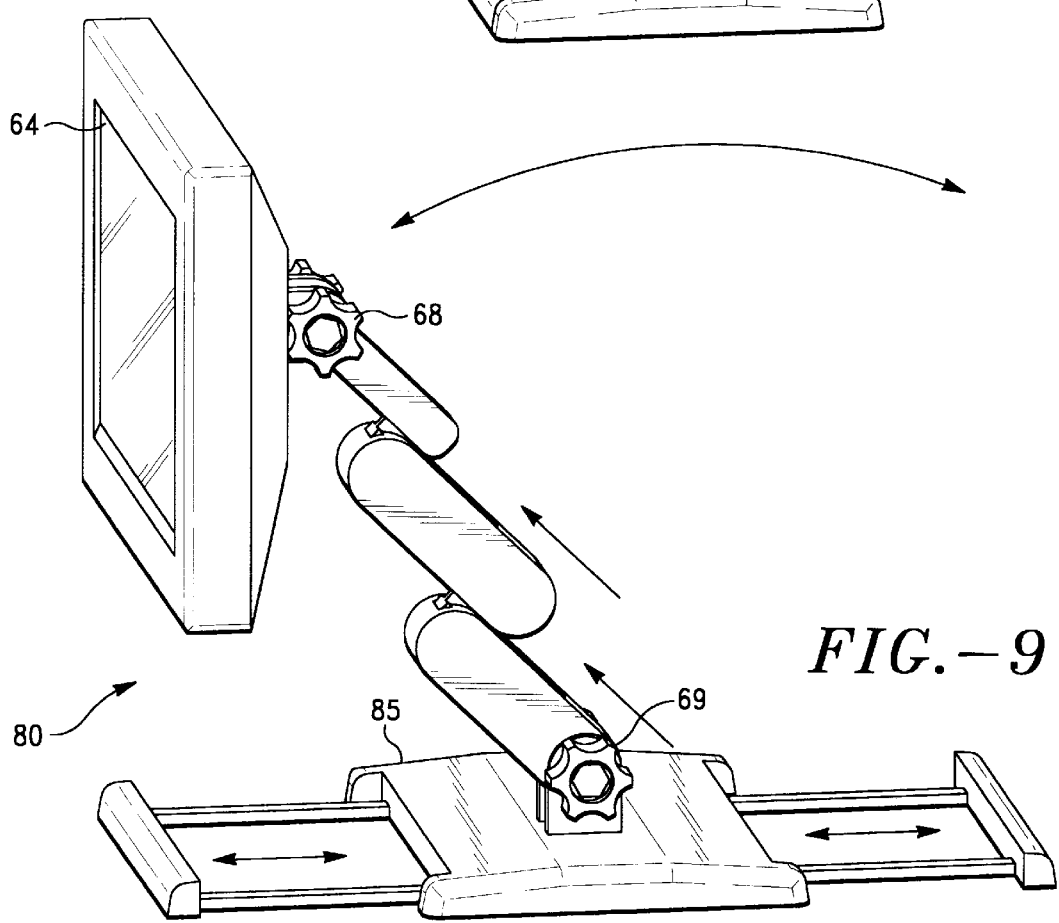
FIG. 9 illustrates an embodiment of an adjustable flat panel display having multiple slidable elongated supports including extendable base supports in extended position according to the present invention.

FIG. 8 illustrates an alternative embodiment of the flat panel display assembly an 70. Flat panel display assembly 80 includes extendable base supports 82 and 84. The extendable base supports 82 and 84 supports the flat panel display 64 when the flat panel display assembly 80 is extended. FIG. 9 illustrates the flat panel display assembly 80 with extendable base supports 82 and 84 and the flat panel display 64 extended. Adjustments of minor hand wheel 68 and main hand wheel 69 afford angular positioning of the flat panel display 64. The extendable supports 80 and 82 provide additional support to prevent base 85 from toppling when the flat panel display 64 is extended.

While the foregoing detailed description has described present embodiments of a flat panel display with adjustable height, it is to be understood that the above description is illustrative only and not limiting of the disclosed invention. Obviously, many modifications and variations will be apparent to the practitioners skilled in this art. Accordingly, the flat panel display with adjustable height has been provided. The flat panel display with adjustable height affords optimal ergonomic viewing angles that reduce the occurrence of user fatigue associated with viewing an output display for a long length of time.

What is claimed is:

1. An adjustable display stand comprising:

a base;

an arced channel support coupled to the base having a T-channel along a curved face of the arched channel; and a display having a T-shaped protrusion configured to slidably mate with the T-channel of the arced channel support affording adjustable support for the display.

2. The adjustable display stand of claim 1, wherein an interference between the T-channel of the arced channel support and the T-shaped protrusion of the display affords the display to be positioned in a plurality of viewing positions.

3. An adjustable display stand comprising:

a base;

a main member pivotally coupled to the base having a main channel;

a display;

a minor member pivotally coupled to the display having a minor protrusion slidably coupled to the main channel of the main member, the minor member being configured to facilitate movement of the display when the minor protrusion slides within the main channel;

an intermediate member having an intermediate protrusion slidably coupled to the main channel of the main member and an intermediate channel slidably coupled to the minor protrusion of the minor member to afford the display to move as the minor protrusion of the minor member slides within the intermediate channel of the intermediate member and as the intermediate protrusion of the intermediate member slides within the main channel.

4. The adjustable display stand of claim 3 further comprising a minor hand wheel configured to tension the pivotally coupling between the display and the minor member to control angular motion of the display.

5. The adjustable display stand of claim 3 further comprising a main hand wheel configured to tension the pivotally coupling between the base and the main member to control angular motion of the main member.

6. The adjustable display stand of claim 3 further comprising an extendable support configured to extend from the base to provide additional angular support for the display.

* * * * *